No. 641,628. Patented Jan. 16, 1900.
F. W., A. G. & E. A. HOEFER.
MACHINE FOR MAKING FENCE WIRE.
(Application filed June 14, 1899.)
(No Model.) 8 Sheets—Sheet 1.

Witnesses:
Chas. O. Shurvey.
D. Bliss.

Inventors:
Frederick W. Hoefer
August G. Hoefer
Emil A. Hoefer
by Wilkinson & Fisher,
Attys.

No. 641,628. Patented Jan. 16, 1900.
F. W., A. G. & E. A. HOEFER.
MACHINE FOR MAKING FENCE WIRE.
(Application filed June 14, 1899.)
(No Model.) 8 Sheets—Sheet 2.

Witnesses:
Chas. O. Shurvey.
A. Bliss.

Inventors:
Frederick W. Hoefer
August G. Hoefer
Emil A. Hoefer
by Wiles, Irwin & Bitner,
Attys.

THE NORRIS PETERS CO., PHOTO-LITHO., WASHINGTON, D. C.

No. 641,628. Patented Jan. 16, 1900.
F. W., A. G. & E. A. HOEFER.
MACHINE FOR MAKING FENCE WIRE.
(Application filed June 14, 1899.)
(No Model.) 8 Sheets—Sheet 4.

Witnesses:
Chas O Stowey
S. Bliss.

Inventors:
Frederick W. Hoefer
August G. Hoefer
Emil A. Hoefer
by Wilkinson & Bitner,
Attys.

No. 641,628. Patented Jan. 16, 1900.
F. W., A. G. & E. A. HOEFER.
MACHINE FOR MAKING FENCE WIRE.
(Application filed June 14, 1899.)
(No Model.) 8 Sheets—Sheet 6.

No. 641,628. Patented Jan. 16, 1900.
F. W., A. G. & E. A. HOEFER.
MACHINE FOR MAKING FENCE WIRE.
(Application filed June 14, 1899.)
(No Model.) 8 Sheets—Sheet 7.

Witnesses
Chas. O. Blurvey
D. Bliss.

Inventors:
Frederick W. Hoefer
August G. Hoefer
Ernst A. Hoefer
by Westmann & Bitner,
Attys.

THE NORRIS PETERS CO., PHOTO-LITHO., WASHINGTON, D. C.

UNITED STATES PATENT OFFICE.

FREDERICK W. HOEFER, AUGUST G. HOEFER, AND EMIL A. HOEFER, OF FREEPORT, ILLINOIS.

MACHINE FOR MAKING FENCE-WIRE.

SPECIFICATION forming part of Letters Patent No. 641,628, dated January 16, 1900.

Application filed June 14, 1899. Serial No. 720,455. (No model.)

*To all whom it may concern:*

Be it known that we, FREDERICK W. HOEFER, AUGUST G. HOEFER, and EMIL A. HOEFER, citizens of the United States of America, residing at Freeport, in the county of Stephenson and State of Illinois, have invented certain new and useful Improvements in Machines for the Manufacture of Fence-Wire, of which the following is a specification.

Our invention relates to certain improvements in machines for the manufacture of fence-wire, the object of the same being to produce a machine of the greatest possible simplicity, strength, and durability, together with the maximum adaptability to a variety of widths and other variations in the form, construction, and style of wire fabric to be produced.

To such end the invention consists in certain novel characteristics through which the desired improvements are obtained, which characteristics have been embodied in a machine of preferred form and construction, the exact details of which will be described specifically without, however, any intention of thereby limiting the invention to such details, the purpose being to accurately set forth a machine containing the invention and possessing the desired improvements in such a way that said machine may be easily constructed by one moderately familiar with the art of wire-handling machinery.

The invention is illustrated in the drawings by means of twenty figures of which—

The machine illustrated in the drawings is intended for the manufacture of fence-wire of considerable width, containing a number of longitudinal strands connected by transverse strands extending obliquely with reference to the longitudinal strands. It can, however, be adjusted to make any desired width either with or without the longitudinal strands.

Referring to the drawings, A is the main frame of the machine, which is here preferably constructed of two longitudinal angle-iron side pieces $a^x$, two transverse angle-iron end pieces $a^y$, and four supporting-legs $a$. Upon this frame are supported the various parts of the machine, shown as consisting in general of a series of wire-straighteners for the longitudinal wires, a series of guides for the same, a series of bobbins for the oblique wires, suitable mechanism for handling the bobbins to twist the oblique wires together and about the longitudinal wires, stretching devices to keep the fence of the required width, feed devices to advance the same, and rolling or winding devices to take care of the finished product. In addition to these a series of reel-supports should be used to carry the longitudinal wires before they feed into the machine; but supports of this character are so common that it is not thought necessary to illustrate or describe them here.

Figure 3:
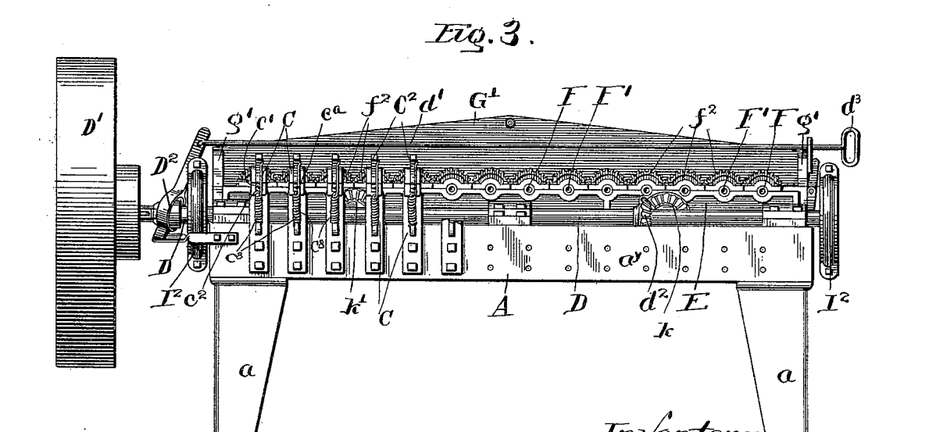
Fig. 3 is an end elevation looking in the direction of the arrow 3 in Fig. 1.
Figures 6, 7, 8:
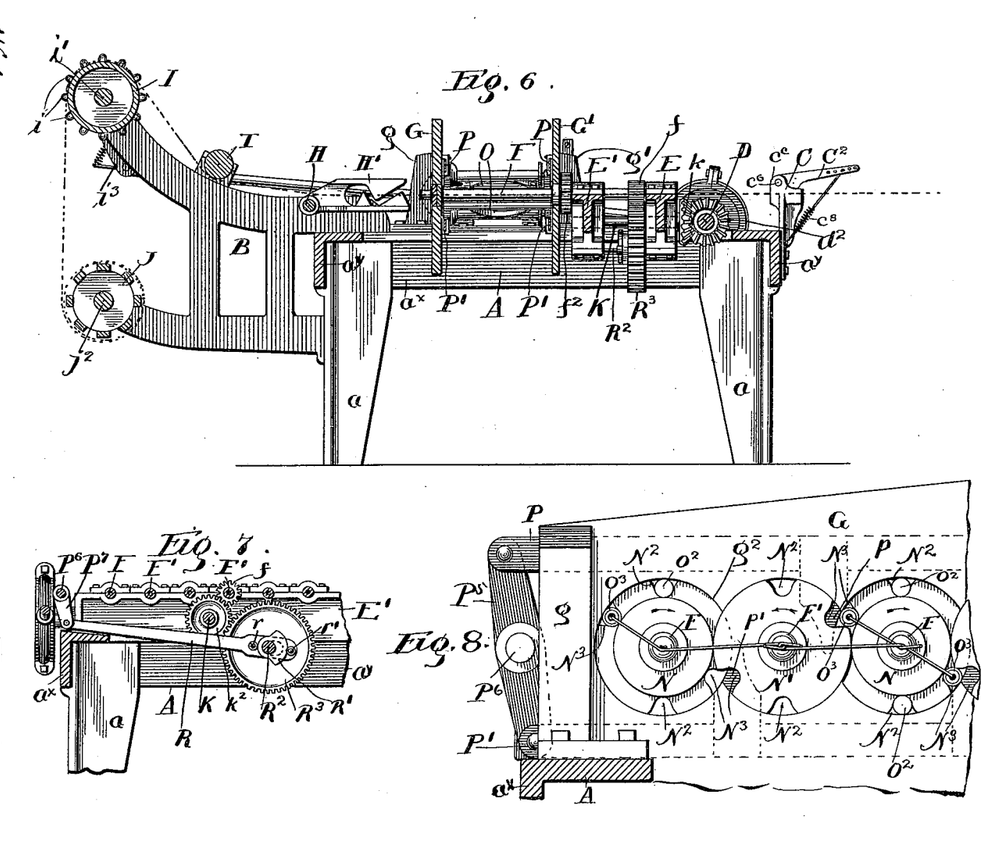
Fig. 6 is a vertical longitudinal section through the machine, taken in the line 6 6 of Fig. 1.
Fig. 7 is a vertical cross-section of a portion of the machine in the line 7 7 of Fig. 1.
Fig. 8 is a cross-section through one of the members forming the main frame of the machine and showing one of the bobbin-supporting plates and carrier-disks in side elevation, the line of section being indicated at 8 8 of Fig. 1.
Figure 19:
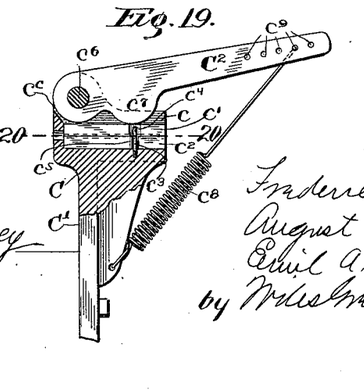
Fig. 19 is a side elevation of a wire-straightener with certain portions broken out to reveal parts otherwise hidden from view.
Figure 20:
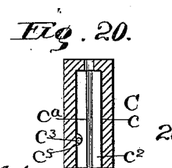
Fig. 20 shows a horizontal section in line 20 20 of Fig. 19.

The wire-straighteners will be seen at C, the preferable manner of bolting them to the main frame being clearly shown in Figs. 3 and 6. A detail view of one of the straighteners is seen in Fig. 19, in which the standard which is bolted to the frame is lettered $C'$. Its upper face is provided with a horizontal channel $c$, except at one end, and in this channel are laid two friction-blocks $c'$ $c^2$, one upon the other, their meeting faces being provided with registering semicircular grooves $c^a$. A perforation in the closed end of the channel $c$ forms a continuation of the groove in the blocks and affords a passage for the wire. The two blocks are held against longitudinal movement by pin $c^3$, secured in the standard and projecting upward through notches $c^4$ $c^5$ in the sides of the plates $c'$ $c^2$, as seen in Fig. 20. The standard has two upwardly-projecting ears $c^e$, Figs. 4 and 6, between which is pivoted a lever $C^2$ upon a pin $c^6$. Said lever is provided with a hump $c^7$, which bears upon the upper plate and is drawn down upon the same by means of a spring $c^8$, secured to the standard and hooked on one of a series of holes $c^9$ in the free end of the lever $C^2$. The strength of the spring is adjusted to give the longitudinal wires sufficient tension as they pass through the machine and also to straighten out the kinks and sharp ends.

Figure 1:
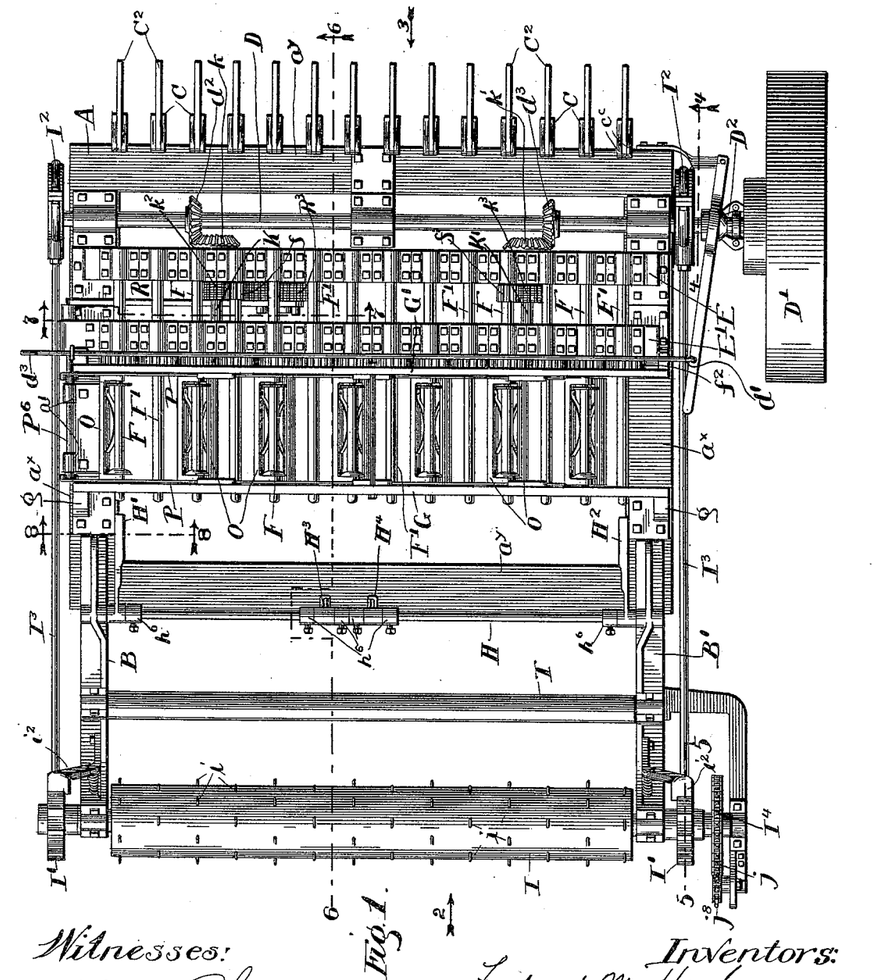
Figure 1 is a plan view of the complete machine.
Figure 2:
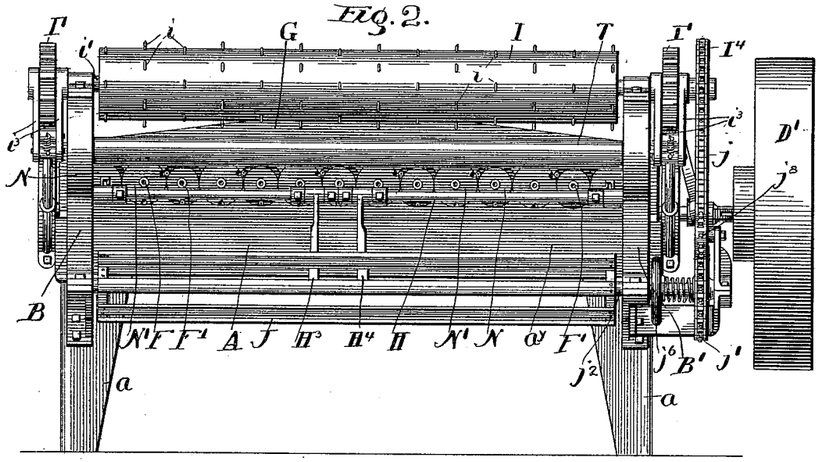
Fig. 2 is an end elevation of the same looking in the direction of the arrow 2 in Fig. 1.

Looking at the plan view in Fig. 1, two transverse bars E E' will be seen extending between the side pieces of the frame and supported upon the latter. These bars are provided with a series of boxes in which are journaled hollow spindles F F', geared together by means of a series of pinions $f^2$, so as to rotate together and extending beyond said pinions through two transverse vertical plates G G', supported by standards $g$ $g'$, fastened to the side pieces of the frame. The plate G supports the adjacent ends of the spindles, as will be hereinafter described. Each of the plates is cut away about the spindles to provide circular openings $g^2$ $g^3$, in which are arranged shuttle-carrying disks M M' N N', rigidly supported upon the spindles F F'. The spindle centers are arranged close enough together so that the circular outlines of the openings overlap in order that the shuttles may pass from one opening to another in the operation of a machine.

Figure 9:
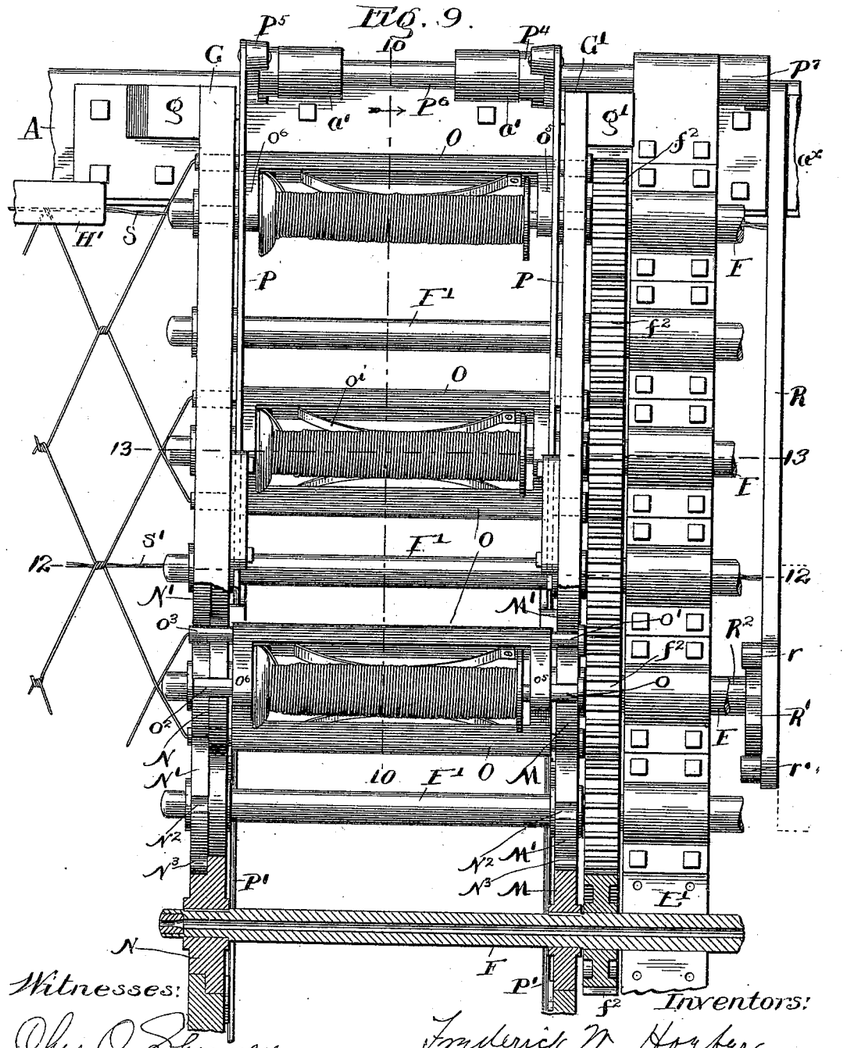
Fig. 9 is a detail plan view of the bobbin-supporting plates, carriers, a number of the bobbins, shuttles, and adjacent parts, the plates being partly broken away and one of the bobbin-carriers at the bottom being in longitudinal diametrical section.
Figure 10:
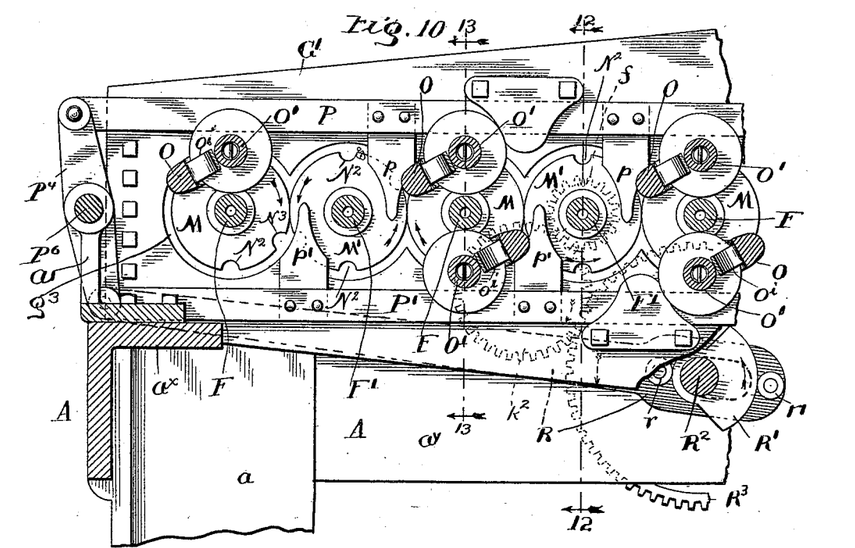
Fig. 10 is a detail vertical cross-section in line 10 10 of Fig. 9.
Figure 11:
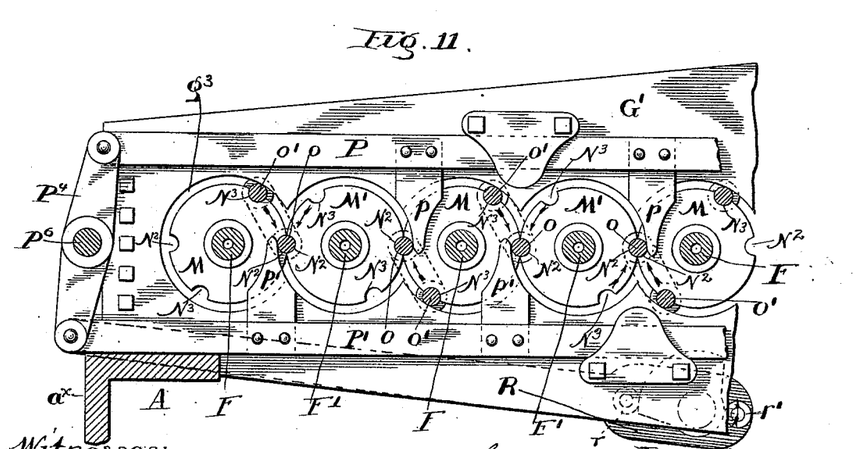
Fig. 11 is an inside face view of one of the bobbin-supporting plates and carriers, the bobbins and shuttles being cut away, leaving the spindles and shuttle-gudgeons in cross-section.

Looking first at Figs. 10 and 11, which show the openings $g^3$ and the disks M M', it will be seen that the disks are enough smaller than the openings so that they may just clear one another. This is satisfactory in the case of the plate G' and the disks M M', because the spindles F' are supported at this end by the boxes upon the transverse bars E E'. It is advisable, however, that the opposite ends of the spindles have some support nearer than these boxes, and for this reason we have supported them in the plate G by means of the disks N N'. For this purpose the disks N N' are fitted to the openings in the plate and their edges are cut away, so as to overlap, as is seen in Fig. 9 at the left, the inner sides of the disk N and the outer sides of the disk N' extending out to the plate G and bearing upon the same.

Figure 12:
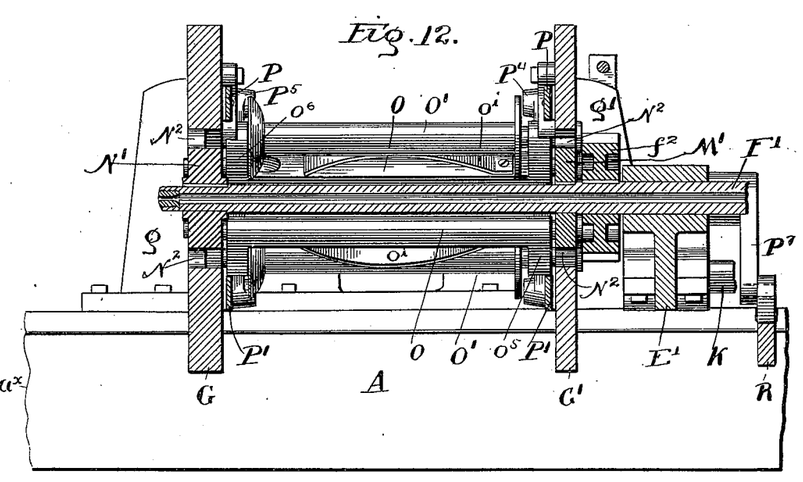
Fig. 12 is a vertical longitudinal section in line 12 12 of Fig. 9.
Figure 13:
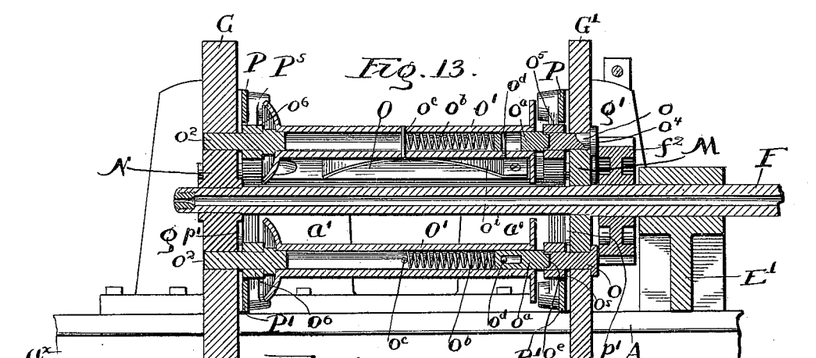
Fig. 13 is a similar section in line 13 13 of Fig. 9.
Figure 14:
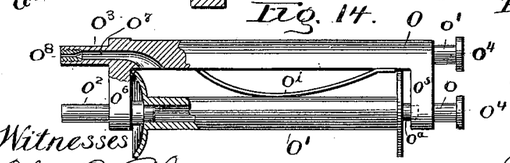
Fig. 14 is a detail side view of one of the shuttles and bobbins with certain portions broken out.

In the peripheries of one of the shuttle-carrying disks are two pairs of notches, the members of each pair being lettered, respectively, $N^2$ $N^3$, and shuttles O are provided, having gudgeons $o$ $o'$ $o^2$ $o^3$ adapted to rest in these notches and be carried around thereby as the disks are rotated by driving mechanism hereinafter described. One of the pairs of notches upon each disk registers with a corresponding pair upon the disk on one side and the other pair with a corresponding pair on the disk on the other side, as they all rotate so that each one of the shuttles may be transferred or shifted from one disk to an adjacent disk and back again to weave the wire. The paths of the shuttles are determined by a series of switch-points $p$ $p'$, supported by transverse bars P P' and moved back and forth by switching mechanism hereinafter described, the switch-points in each case being arranged upon the side of the disk-supporting plate toward which the disks rotate. As the disks come into the open sides of the circular opening in the plate their outer halves pass into the notches in the adjacent disks, and by guiding them in the proper direction as they leave these open sides they may be thrown upon either of the two disks. It should be noticed, therefore, that means are thus provided for carrying the bobbins and shuttles about the hollow spindles, shifting them to the adjacent spindles and back again to carry the oblique wires back and forth in the weaving of the fence. The construction of the shuttles and bobbins is clearly shown in Figs. 12, 13, and 14, the shuttle being provided at its opposite ends with longitudinally-projecting gudgeons $o'$ $o^3$, the gudgeon $o'$ being provided with a head $o^4$ to secure the shuttle against longitudinal movement, and the gudgeon $o^3$ being perforated at $o^7$ to form a passage for the wire and being provided in the end of said passage with a die $o^8$ to straighten the same. Between these gudgeons are two laterally-projecting arms $o^5$ $o^6$, in which are supported longitudinally-extending pins $o^2$ $o$, the pin $o$ having a head $o^4$ similar to that upon the gudgeon $o'$ at its outer end and a socket $o^e$ in its inner end to receive the movable center of the bobbin. The pin $o^2$ has its inner end reduced in size to enter the bobbin and form a center upon which the latter may turn. A friction-spring $o^1$ is secured to the main portion of the shuttle and bears upon the wire to prevent too rapid unwinding of the same when the bobbin is full.

The bobbin itself consists of a hollow cylindrical center $o'$ with circular flanges at its opposite ends and is provided with a longitudinally-sliding center $o^a$, pushed outward by a spring $o^b$, confined between said center and a pin $o^c$. The outward movement of the center is limited by means of the pin $o^d$ working in a slot in the center. The bobbin is inserted or removed by forcing in the sliding center $o^a$ until it clears the socket $o^e$.

Figure 16:
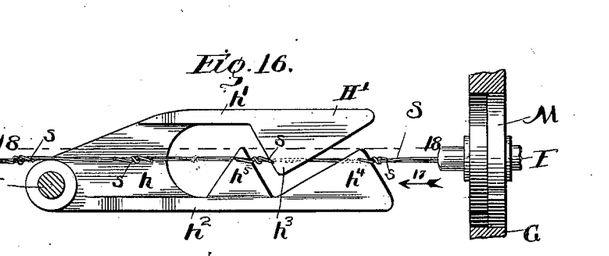
Fig. 16 is a detail side view of one of the spreading-dogs and bobbin-carrying disks with the plate in vertical section, the line of section being indicated at 16 16 in Fig. 18.
Figure 17:
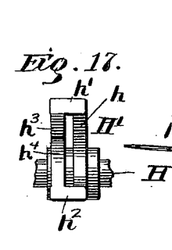
Fig. 17 is an end view of said dog looking in the direction of the arrow 17 in Fig. 16.
Figure 18:
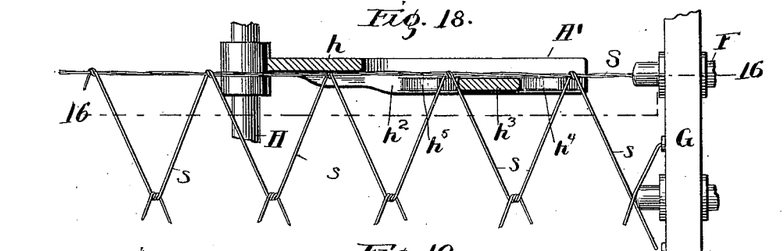
Fig. 18 is a horizontal longitudinal section taken in line 18 18 of Fig. 16.

Figs. 9, 10, and 11 illustrate the operation of the twisting devices consisting of the carrying spindles and disks, the shuttles, and the bobbins. Looking at Figs. 9 and 10, it will be seen that every other spindle carries two shuttles with the exception of the end spindles and that the intermediate spindles carry none, so that as the spindles rotate the wires upon each pair of shuttles are twisted about each other and, if a longitudinal wire passes through that spindle, about it also—as, for instance, at S S' in Fig. 9. When a sufficient number of turns are made, the shuttles upon each spindle are shifted in opposite directions, separating the two wires and carrying the shuttles upon the spindles which were vacant before. Each one of the wires is now twisted with an adjacent oblique wire and this operation continued as the shuttles are shifted back and forth, weaving the wires carried upon the bobbins into a fabric composed of a series of meshes, the size and form of which are determined by the machine. With the exception of the side wires the operation is just the same without regard to the number of longitudinal strands, the side wires being necessary to support the fabric in the proper shape. Thus by reference to Fig. 9 it will be seen that as the oblique wires come out to the side of the fabric they are twisted about the longitudinal side wires, as there is no oblique wire beyond the same to intertwist therewith. As the finished fence-wire passes from the spindles the end strands are engaged by spreading-dogs H' H², which prevent the fence-wire from being drawn together by the twisting of the transverse strands about the longitudinal ones as the fence is being made. These dogs are best seen in Figs. 16, 17, and 18, and, as shown, each consists of a vertical plate $h$, having horizontal flanges $h'$ $h^2$ projecting from its upper and lower edges, and from the flange $h'$ extends downward a wedge-shaped finger $h^3$. Two similar fingers $h^4$ $h^5$ extend upward from the flange $h^2$, leaving a narrow zigzag opening or channel between the inclined faces of the fingers, as clearly indicated in Fig. 16. The end strand S of the fence-wire passes between the fingers and the plate $h$, and the transverse strands $s$, which extend from said end strand, strike the inclined faces of the fingers $h^4$ $h^5$, and as the fence is fed forward the dogs are tilted downward by the transverse strands riding up the inclined faces on the fingers $h^4$ $h^5$ until they pass by said fingers and engage the inclined face on the fingers $h^3$ and then upward until they pass the middle fingers $h^3$, the vertical oscillation of the dogs allowing the wire to pass through them longitudinally, keeping one or the other of the fingers inside of the outside longitudinal strands to prevent the latter from being drawn in by the twisting operation. These dogs are supported upon a transverse rigid shaft H and are laterally adjustable thereupon to vary the width of the fence. Any number may be used upon a single machine, so that two or more widths of fence may be manufactured at once. The dogs are kept in position by means of collars $h^6$, and four of them are shown in the drawings. When it is desired to make a fence of the greatest width possible with this machine, the two end dogs H' H² are used. These dogs may, however, be adjusted toward each other for narrower fence, or the dogs H³ H⁴ may be brought into use by bringing them into position, and two separate sets of fence may be made by the machine at the same time.

The feeding mechanism consists of a roller I, supported upon brackets B B', secured to the frame of the machine, bearing a series of studs $i$, located to engage the angles of the fabric and advance the same, said roller being driven by mechanism to be described and being connected with the winding-drum, (shown at J,) also carried by the brackets B B'.

Turning now to the driving mechanism, a driving-pulley D' (see Figs. 1 and 3) is loosely mounted upon the main driving-shaft D and engages therewith, when desired, by means of a clutch D², provision being made for the operation of the clutch from either side of the machine by means of a rod $d'$, extending to the opposite side and there provided with a handle $d^3$. The driving-shaft is geared to the twisting-spindles by means of two miter-gears $d^2$ $d^3$, fast upon said driving-shaft and in mesh with miters $k$ $k'$ upon two longitudinal shafts K K', (see Figs. 6 and 7,) suitably journaled and bearing gears $k^2$ $k^3$, the latter being seen in Fig. 1, said gears being in mesh with pinions $f$ $f'$ upon two of the twisting-spindles. The two sets of gears described are used merely for strength, the twisting-spindles being all geared together, so that the rotation of one will rotate all. The gear $k^2$ operates the shuttle-switching mechanism through a gear R³, (see Fig. 7,) fast upon a shaft R², which has secured to it a cam R' and guided upon it a reciprocating bar R, slotted to the shaft, the bar having two pins and antifriction-rollers $r$ $r'$ to embrace the cam and sustain the thrust of the same as it reciprocates the bar back and forth upon the shaft. The other end of the bar is pivoted to a crank-arm $P^7$ upon one end of an oscillating shaft $P^6$, extending longitudinally along one side of the machine, as shown in Fig. 9, and journaled in brackets $a'$. (See Fig. 10.) Upon the oscillating shaft are secured between their ends two oscillating plates $P^4$ $P^5$, the ends of which are pivoted to transverse bars P P', carrying the switch-points $p$ $p'$, the bars being guided in suitable guides, so that they may be reciprocated by the oscillating plates. By reference to Figs. 10 and 11 it will be seen that the upper switch-points move in the opposite direction to that of the lower switch-points, so that as the lower switch-points pick up one set of shuttles and switch them in one direction the upper switch-points pick up the other set and switch them in the opposite direction, the shuttles being thus shifted back and forth as the operation proceeds.

The relative sizes of the gears $R^3$ $f$ (see Fig. 7) determine the number of twists that will be given to the oblique wires. Both the gears are driven by the gear $k^2$, each revolution of the gear $f$ effecting one twist of the oblique wires and each revolution of the gear $R^3$ effecting two movements of the shifting mechanism. The ratio of the gears $R^3$ $f$ in the drawings is four to one, so that two revolutions of the twisting mechanism are effected between each operation of the switching mechanism. This can be varied, of course, as desired for the corresponding variation in the fabric.

Figures 4, 5:
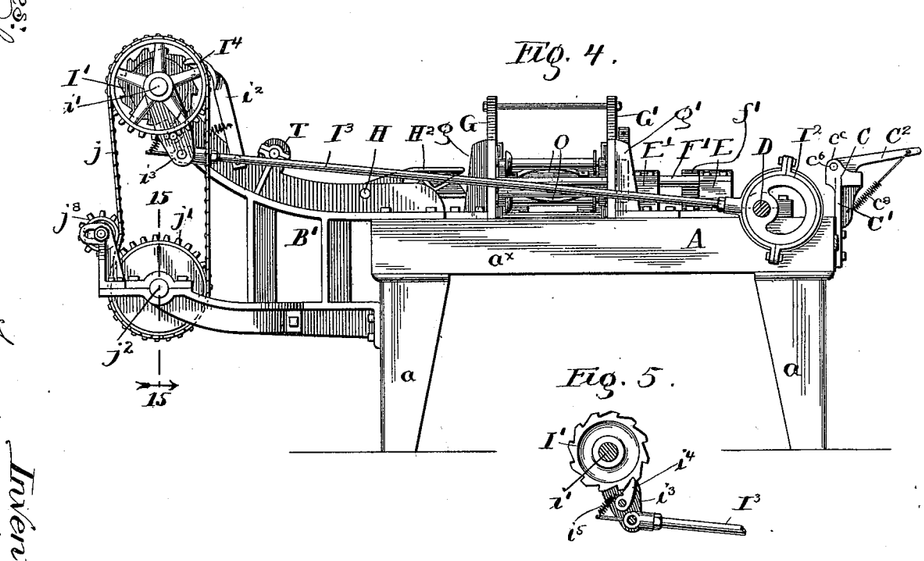
Fig. 4 is a side elevation of the machine, a portion of the main driving-shaft, including the clutch mechanism and drive-pulley, being cut away, in section-line 4 4 of Fig. 1.
Fig. 5 is a detail view of a pawl-and-ratchet mechanism for rotating the feed-roller, partly in side elevation and partly in vertical longitudinal section, the line of section being indicated at 5 5 in Fig. 1.
Figure 15:
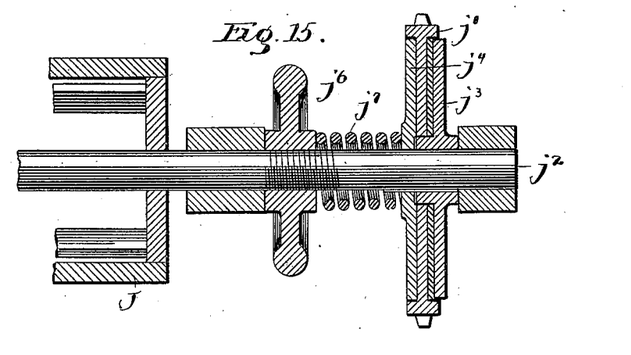
Fig. 15 is a detail vertical cross-section of a friction device, the section being taken in the line 15 15 of Fig. 4.

Turning to Figs. 4 and 5, an eccentric $I^2$ will be seen fast upon the main driving-shaft D, driving a connecting-rod $I^3$, the opposite end of which is pivoted to an oscillating lever $i^3$, itself pivoted upon the shaft $i'$. Adjacent to this oscillating arm is a ratchet-wheel I', fast upon said shaft and operated by a detent $i^4$, drawn into the ratchet by a spring $i^5$. A second detent $i^2$, pivoted to the bracket B', also engages with the ratchet and prevents its return movement when the detent $i^4$ takes a new hold. This mechanism advances the fabric step by step as the wires are twisted together, the advance being effected during the switching or shifting of the shuttles and the ratchet mechanism taking a new hold during the twisting operation. The feed-roller is geared to the winding-drum by means of a sprocket-wheel $I^4$ upon the shaft $i'$ carrying a sprocket-chain $j$, running between an idler $j^8$ and a sprocket $j'$ upon a shaft $j^2$, journaled in the brackets B B'. The sprocket-wheel $j'$ (see Fig. 15) is connected to the shaft $j^2$ by means of a friction device consisting of two plates $j^3$ $j^4$, keyed or otherwise secured upon the shaft, and an interposed disk of leather or similar material. A hand-wheel $j^6$ is threaded upon the shaft $j^2$, and a coiled spring $j^7$ is interposed between the hand-wheel and the disk $j^4$, by which means the friction between the sprocket-wheel $j'$ and the disk $j^3$ $j^4$ can be varied at will.

The relative sizes of the winding-drum, the feed-roller, and the interposed gearing are such that sufficient rotation is always given to the winding-drum to wind up the wire fabric. As the size of the roll increases it winds up faster, and the sprocket-wheel $j'$ slips in the friction device to compensate for this increase.

An idle roller T (see Figs. 1, 2, 3, 4, and 6) is journaled in the brackets B B' to hold the wire down upon the feed-roll.

We claim as new and desire to secure by Letters Patent—

1. In a machine of the class described, the combination with the frame, a series of rotating twisting-spindles, a series of overlapping notched shuttle-carrying disks upon said spindles near the delivery end thereof and a supporting-plate carried by the frame having a series of overlapping circular openings fitted to the said disks whereby the delivery ends of the twisting-spindles are supported by the said plate; substantially as described.

2. In a machine of the class described, the combination with a series of twisting-spindles provided with notched shuttle-carrying disks, of a series of shuttles having a pair of gudgeons at each end adapted to enter said notches, one of said gudgeons being perforated to permit of the passage of the wire and a series of bobbins suitably supported in the shuttles; substantially as described.

3. In a machine of the class described, a lateral stretching device, consisting of an oscillating dog containing a zigzag slot through which the transverse wires may travel; substantially as described.

4. In a machine of the class described, an oscillating dog bearing overhanging portions provided with teeth or points arranged to form a zigzag slot whereby a longitudinal strand may be held between the body of the dog and the overhanging points while the oscillation of the dog permits the transverse strands to pass through the zigzag slot; substantially as described.

5. In a machine of the class described, a straightening or tension device consisting of a channeled standard bearing grooved friction-plates held against longitudinal movement in the standard and a spring-pressed lever bearing upon said friction-plates to hold them together; substantially as described.

6. In a machine of the class described, the combination with a positive-feed device, of a winding-drum and shaft for said drum bearing a loose pulley positively geared to the driving mechanism, friction devices fast upon the shaft and bearing upon the pulley, a spring crowding the friction devices toward the pulley and means for adjusting said spring; substantially as described.

7. In a machine of the class described, the combination with a series of spindles geared together so that the alternate ones rotate in the same direction, disks, M, M', N, N', mounted upon said spindles and a series of shuttles arranged in pairs upon the alternate pairs of disks, of a series of switch-points adapted to engage said shuttles and shift them from one set of disks to the other, bars supporting said switch-points and suitable mechanism interposed between said bars and the spindles adapted to reciprocate the switch-points at the proper times to shift the shuttles; substantially as described.

8. In a machine of the class described, the combination with the hollow spindles, F, F', geared together and provided with suitable means for their rotation in unison, the alternate ones of which move in the same direction, and shuttles arranged in pairs and adapted to rotate with the alternate spindles, of switch-points, $p$, $p'$, $p^2$, $p^3$, adapted to engage said carriages, switch-bars, P, P', $P^2$, $P^3$, carrying said switch-points, an arm, $P^4$, connected to said bars, a pitman, R, adapted to oscillate said arm, a cam for reciprocating the pitman at suitable intervals and suitable gearing between said cam and the spindles adapted at the proper times to actuate said cam; substantially as described.

9. In a machine of the class described, two plates, G, G', formed with circular overlapping openings, $g^2$, $g^3$, in their faces, a series of suitably-supported disks rotating in said openings and formed with notches in their peripheries, said disks being geared so that the adjacent ones rotate in opposite directions and the alternate ones in the same direction and shuttles having gudgeons adapted to rest in said notches and be carried by the disks; substantially as described.

10. In a machine of the class described, the combination with a series of rotatable disks formed with notches in their peripheries, the notches in the adjacent disks being adapted to register with each other as they pass by the center line of the disks, shuttles having suitable gudgeons adapted to rest in said notches, plates, G, G', formed with the overlapping openings, $g^2$, $g^3$, embracing said disks and forming a track for the gudgeons, suitably supported and reciprocated switch-points adapted to engage said gudgeons on either side and switch the shuttles from one set of disks to the other at suitable intervals; substantially as described.

11. In a machine of the class described, a shuttle therefor, having the arms, $o^5$, $o^6$, gudgeons, $o$, $o'$, $o^2$, $o^3$, extending from said arms, one of said gudgeons being hollow to permit the wire to pass through the same; substantially as described.

12. A shuttle for fence-wire machines having two transversely-extending arms, $o^5$, $o^6$, gudgeons, $o$, $o'$, $o^2$, $o^3$, extending from said arms, one of said gudgeons being hollow to permit the wire to pass through the same, a pin, $o^2$, extending from the inside of the arm, $o^6$, a socket, $o^e$, in the inner end of the pin, $o$ in the arm, $o^5$, a bobbin, O', having one end journaled upon the pin, $o^2$, and a spring-pressed bolt, $o^a$, in said bobbin adapted to be seated in the socket, $o^e$, in the arm, $o^5$; substantially as described.

13. In a fence-wire machine, the combination with suitable devices for weaving fence-wire having longitudinal and transverse strands, of means for winding up said wire, and oscillating dogs arranged between the weaving devices and the winding devices having fingers pointing toward each other, the adjacent fingers being adapted to engage the outside longitudinal strand upon both sides of a transverse strand, whereby the oscillation of the dogs may permit the transverse wire to pass successively past said points; substantially as described.

14. In a fence-wire machine, a dog arranged adjacent to the devices for weaving the fence-wire and comprising substantially a vertically-extending plate formed with flanges along its upper and lower margin, suitably-separated fingers, $h^3$, $h^4$, $h^5$, extending from said flanges and adapted to engage the end strand of the fence, said fingers being formed with inclined faces whereby the transversely-extending strands of the fence may ride up or down said inclined faces and between the fingers without disengaging the longitudinal strands from said fingers; substantially as described.

15. In a fence-wire machine, the combination with a suitably-driven shaft, of a series of devices for weaving transverse and longitudinal strands of fence-wire, a feed-roller adapted to feed said fence-wire at suitable predetermined intervals, a suitably-journaled shaft supporting said feed-roller, a ratchet-wheel mounted upon said shaft, a pawl engaging said shaft, an eccentric mounted upon the main driving-shaft and a connecting-rod between said pawl and eccentric whereby said feed-roller may be actuated at the proper time; substantially as described.

16. In a fence-wire machine, a drum for winding up the completed fence-wire, a shaft carrying said drum and journaled in suitable bearings, disks keyed to said shaft, a hand-wheel threaded upon the shaft, a coiled spring interposed between the hand-wheel and one of said disks, a sprocket-wheel having a web confined between said disks and suitable gearing between said sprocket-wheel and the driving mechanism of the machine; substantially as described.

In witness whereof we have hereunto set our hands at Freeport, in the county of Stephenson and State of Illinois, this 6th day of June, A. D. 1899.

FREDERICK W. HOEFER.
  AUGUST G. HOEFER.
  EMIL A. HOEFER.

Witnesses:
 C. M. STAHL,
 E. W. MULLEN.